United States Patent

[11] 3,588,078

[72] Inventor Nicholas Van De Sande
  11933 Darlington Ave., Los Angeles, Calif. 90049
[21] Appl. No. 806,206
[22] Filed Mar. 11, 1969
[45] Patented June 28, 1971

[54] HOLDER FOR FISHHOOKS AND OTHER SMALL COMPONENTS
  4 Claims, 6 Drawing Figs.
[52] U.S. Cl. ........................................... 269/6, 43/1, 43/53.5, 43/57.5
[51] Int. Cl. ........................................... B25b 1/00, B25b 3/00, A01k 97/06
[50] Field of Search ........................................... 43/57.5, 1, 4, 44.87, 44.92, 44.95, 53.5; 269/6, 254

[56] References Cited
UNITED STATES PATENTS

| | | | |
|---|---|---|---|
| 1,653,335 | 12/1927 | Bettum | 269/6X |
| 2,530,713 | 11/1950 | Martinez | 269/6 |
| 2,719,381 | 10/1955 | Matras | 43/44.95 |
| 2,934,369 | 4/1960 | Kennedy | 43/1X |
| 3,012,361 | 12/1961 | Arnold | 43/57.5 |
| 3,050,896 | 8/1962 | Parker | 43/4 |

*Primary Examiner*—Samuel Koren
*Assistant Examiner*—Daniel J. Leach
*Attorneys*—William D. Hall, Elliott I. Pollock, Fred C. Philpitt, George Vande Sande, Charles F. Steininger and Robert R. Priddy ABSTRACT: A holder for fishhooks or the like comprising a pen barrel shaped outer member adapted to be clipped to a shirt pocket and having an ejection-retraction mechanism selectively operable to move a loop-shaped wire member outwardly against the restoring force of a spring so as to permit a fishhook or the like to be inserted in the loop, the loop-shaped member when retracted securely holding the fishhook or similar small component.

PATENTED JUN28 1971    3,588,078
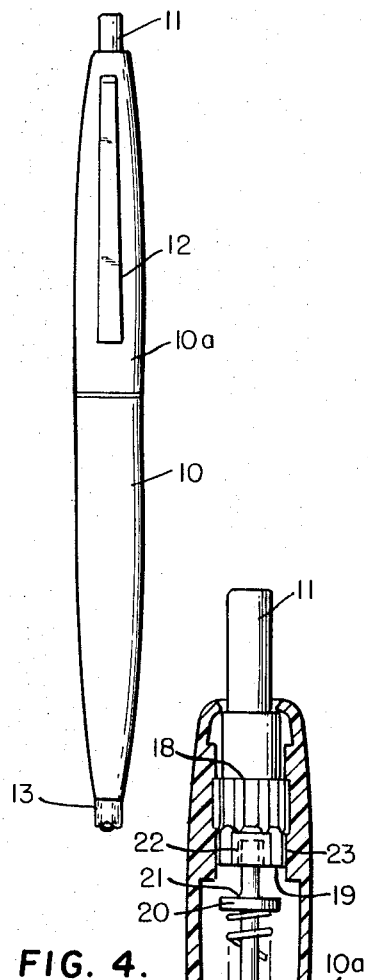
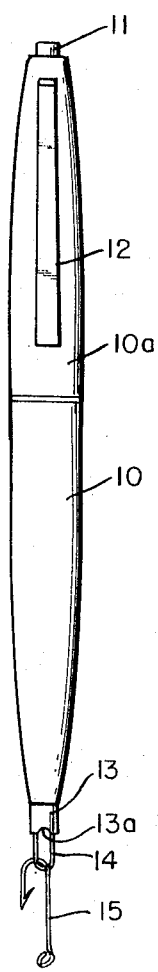
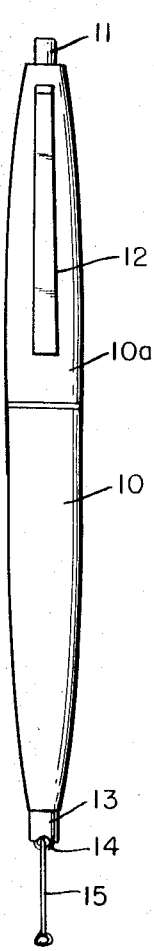
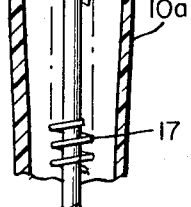
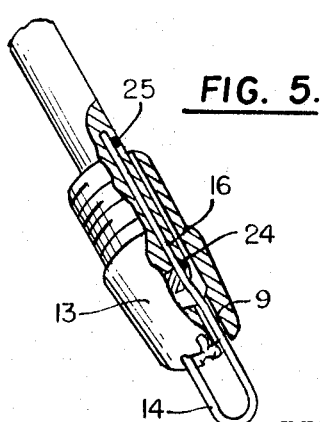
INVENTOR
Nicholas Van De Sande
BY Hall, Pollock & Vande Sande
ATTORNEY

3,588,078

HOLDER FOR FISHHOOKS AND OTHER SMALL COMPONENTS

BACKGROUND OF THE INVENTION

Devices of several types have been proposed for holding a fishhook or fly while a fishing line or leader is attached. Vises are available for this purpose, but the objection to them is that their size has generally precluded their being conveniently carried by a fisherman. Although more readily portable devices have been devised, none that I am aware of are as compact and readily transportable in a fisherman's shirt pocket as the device of this invention, nor do any of the more portable devices of the prior art hold a fishhook or fly or small component as securely as does the device of this invention.

SUMMARY OF THE INVENTION

It is an object of this invention to provide a holder for a fishhook or other small component which will securely hold the component comprising a device which is readily portable. It is capable of being conveniently carried in one's shirt pocket and clipped thereto in exactly the same manner as the conventional ballpoint pen, and may be conveniently and economically manufactured. It is so constructed as to conveniently permit the grasping and subsequent release of the device or component being held.

As will appear hereinafter, the holding device of this invention is also capable of use in holding small components or parts, particularly electronic components or parts while assembling and/or soldering such components into a circuit.

BRIEF DESCRIPTION OF THE DRAWINGS

FIG. 1 is a view of the holder of the invention showing the loop-shaped wire member which forms the loop for holding a fishhook or fly or similar small component in the retracted position;

FIG. 2 shows the loop-shaped wire member in the outwardly extended position so as to form an open loop into which a fishhook or fly may be placed;

FIG. 3 shows the device of the invention with the loop-shaped wire member again retracted so as to securely hold the fishhook or fly in place;

FIG. 4 is a cross-sectional view of the device of FIGS. 1—3;

FIG. 5 is a cross-sectional perspective view of the tip portion of the device of FIGS. 1—3; and FIG. 6 is a view of an alternative embodiment disclosing a generally L-shaped loop member.

DETAILED DESCRIPTION OF THE PREFERRED EMBODIMENT

The holding device of this invention is shown in FIGS. 1—3 as having an outer configuration which is very similar to that of a conventional ballpoint pen. Thus, the device comprises a pen-shaped barrel including a lower portion 10 and an upper portion 10a which are adapted to be screwed together in conventional manner. The upper portion of the barrel 10a has secured thereto a conventional clip 12 which facilitates the securing of the device to one's shirt pocket in the same way as with a ballpoint pen. At the top of the upper barrel 10a is provided a conventional plunger device 11 which, as will be shown, acts upon an elongate rod in the interior of the device to move it axially between two different predetermined positions. This mechanism is also of the identical type used commonly in ballpoint pens and by itself forms no part of the present invention.

In FIG. 1, the device of this invention is shown in the normal manner in which it appears when one is carrying it about in, for example, a shirt pocket. In FIG 2, the plunger device 11 has been operated with the result that a U-shaped wire member 14 has been caused to protrude from the tip member 13, thereby providing an open loop into which a hook or fly 15 may be inserted. In FIG. 3, the plunger has been actuated again, thereby causing the U-shaped wire member 14 to again be retracted, thereby effectively closing the loop and securely holding the fishhook or fly 15 so that one may tie a line or leader to the latter. Incidentally, it will be noted in FIGS. 1—3 that the tip member 13 is provided with a transverse slot 13a therein which facilitates holding the hook or fly 15 securely in place when the U-shaped member 14 is retracted, as shown in FIG. 3.

The cross-sectional view of FIG. 4 shows that the lower barrel member 10 is threaded at its bottom end so as to receive a tip member 13. Within this tip member 13 there is positioned an elongate rod 16 which is axially slidable within the members 13. Rod 16 extends extends throughout the length of the members 10 and 10a and is provided near its upper end with an abutment or shoulder 20 which may comprise a washer or the like which is soldered, as at 21, to the rod 16. The member 20 provides an abutment for the coil spring 17 which is placed about the rod 16. The bottom end of spring 17 abuts against the shoulder formed by the upper end of tip member 13. The result is that a spring continually urges the rod 16 upwardly into a recess 22 formed in member 19 which, together with portion 18 of member 11 forms the ejection-retraction mechanism for selectively moving rod 16 upwardly and downwardly as desired.

The construction and mode of operation of the elements 11, 18 and 19 is well known in the art and will therefore not be described in detail here. It is sufficient to say that as the plunger member 11 is alternately pushed downwardly, the member 19 rotates a portion of a revolution for each such operation and alternately rests in the position shown in FIG. 4 or at a lower position where it abuts against the lower edges of longitudinal ribs 23. The overall effect, in any event, is to provide that, upon alternate operations of plunger 11, the rod 16 will either assume the position shown in FIG. 4 in which event the U-shaped member 14 is substantially fully withdrawn into member 13, or will assume a lower position in which the lower end of rod 16 moves downward further into the tip portion 13 so as to cause the U-shaped wire member 14 to protrude from the lower end of member 13.

The construction and arrangement of the parts in the tip member 13 is better shown in FIG. 5. FIG. 5 shows that the leg portions of the U-shaped wire member 14 extend upwardly into the lower end of rod 16, each leg portion being inserted through a respective bore 9 in tip member 13 and then into two longitudinally extending holes 24 which are provided in rod 16. These holes extend in rod 16 upwardly therein to a point which is beyond that portion of rod 16 that is covered by the tip portion 13 when the U-shaped wire member 14 is fully retracted. To ensure that the wire member 14 is securely attached to the rod 16, a transverse slot 25 may be cut in rod 16 which slot is cut deep enough so that it intersects with the axially extending passage 24. Solder may then be placed in the slot 25 so as to securely attach the upper end of the edge of the wire member 14 to the rod 16. The provision of the two bores 9 in tip member 13 for slidably receiving the respective legs ensures that wire member 14 is not free to rotate relative to such tip member and thus maintains its preferred rotational position transverse to slot 13a in member 13.

In the description given thus far, the device has been particularly described in connection with its use for holding fishhooks, flies, or similar fishing apparatus. It is, however, contemplated that the device may be equally well used for holding other small devices or components as, for example, electrical components to facilitate their being soldered in place. When this is done, it is preferable that the member 14 not have the form of a closed loop in order that the device of the invention can be used to grasp a small component such as a resistor or capacitor, and thereafter be removed even when both ends of the wire lead or the like which is being held are secured in place. For this reason, it may be desirable to modify the device of the invention as shown in FIG. 6 so as to provide that the member 14 is not U-shaped but is instead L-shaped, thereby providing, in effect, an open loop from which a component may readily be removed when the member 14 is extended.

I claim:

1. A holder for small components such as a fishhook comprising in combination,
    a first pen barrel shaped member 10,
    a second member 13 fixedly held by and closing one end of said first member,
    a generally loop-shaped wire member 14 having at least one leg portion which is slidable in a corresponding longitudinal bore in said second member and with its bight portion exterior of the assembled combination of said first and second members to thereby define by said wire member and said second member a loop which is at least partially closed for receiving and holding said component,
    spring-biased means 17 operatively connected to said wire member for normally urging said wire inwardly of said second member to thereby close said loop and secure said component between said second member and said wire member,
    said last-named means 17 permitting movement of said wire member outwardly of said second member to thereby open the loop and facilitate the insertion into or removal therefrom of said component,
    said loop-shaped member being generally U-shaped and said second member having two longitudinal bores each receiving slidably a leg of said U-shaped member.

2. A holder for small components such as a fish hook comprising in combination,
    a first pen barrel shaped member,
    a second member fixedly held by and closing one end of said first member,
    a generally loop-shaped wire member having at least one leg portion which is slidable in a corresponding longitudinal bore in said second member and with its bight portion exterior of the assembled combination of said first and second members to thereby define by said wire member and said second member a loop which is at least partially closed for receiving and holding said component,
    spring-biased means operatively connected to said wire member for normally urging said wire inwardly of said second member to thereby close said loop and secure said component between said second member and said wire member,
    said last-named means permitting movement of said wire member outwardly of said second member to thereby open the loop and facilitate the insertion into or removal therefrom of said component,
    at least one leg portion of said loop-shaped member extending through said second member and being fixedly secured to an elongate rod included in said spring-biased means which further includes a spring means acting on said rod to control the position of said loop-shaped member relative to said second member,
    an elongate diametric transverse slot being formed in the end of said second member and intersecting said bore for receiving a part of the component held within the loop, said longitudinal bore which slidably receives said wire member preventing rotation of said wire member relative to said second member so as to maintain said wire member transverse to said slot.

3. The holder of claim 2 which further includes means for selectively urging said rod relative to said second member against the force of said spring-biased means.

4. The holder of claim 3 which further includes control means secured to and closing the other end of said first member and operable between two different positions longitudinally of said first member for controlling the position of said rod,
    said control means in one position permitting said rod to be urged by said spring-biased means inwardly of said second member and in the other of its positions urging said rod outwardly of said second member against the force of said spring-biased means.